(12) United States Patent
Hyde

(10) Patent No.: US 6,752,026 B1
(45) Date of Patent: Jun. 22, 2004

(54) ANNULAR VOID ELECTROMAGNETIC FLOWMETER

(76) Inventor: Thomas Allen Hyde, 1607 N. H St., Midland, TX (US) 79701-4031

( * ) Notice: Subject to any disclaimer, the term of this patent is extended or adjusted under 35 U.S.C. 154(b) by 0 days.

(21) Appl. No.: 10/358,364

(22) Filed: Feb. 3, 2003

Related U.S. Application Data

(60) Provisional application No. 60/356,100, filed on Feb. 9, 2002.

(51) Int. Cl.[7] .................................................. G01F 1/58
(52) U.S. Cl. .................................................... 73/861.15
(58) Field of Search ........................ 73/861.15, 861.12, 73/861.56, 861.58

(56) References Cited

U.S. PATENT DOCUMENTS

| | | | | |
|---|---|---|---|---|
| 3,398,305 A | * | 8/1968 | Brewer | 73/861.56 |
| 3,805,611 A | | 4/1974 | Hedland | 73/209 |
| 4,424,716 A | * | 1/1984 | Boehringer et al. | 73/861.56 |
| 4,507,976 A | * | 4/1985 | Banko | 73/861.54 |
| 4,945,771 A | * | 8/1990 | Ogden | 73/861.58 |
| 3,805,611 A | | 9/1993 | Hedland | |
| 5,458,007 A | * | 10/1995 | Lake | 73/861.58 |
| 6,675,662 B2 | * | 1/2004 | Wieder et al. | 73/861.57 |

\* cited by examiner

*Primary Examiner*—Edward Lefkowitz
*Assistant Examiner*—Takisha Miller

(57) ABSTRACT

The Annular Void Electromagnetic Flowmeter [AVEF] is a flowmeter in which fluid flow rate of compressible or incompressible fluid is determined by measuring a fluid-mechanical-electrical response that is dependent upon an electromagnetic field. The construction of the flowmeter may be such that it does not reduce the flowing area of an open or closed fluid conduit. The measured electronic response may be generated by a fluid that is in an explosive, fast-transient, or steady-state flow condition, and which fluid may have a laminar, turbulent, or combined flowing property. High resolution of flow rate is achieved by a range of magnitude of the measured voltage with respect to a reference voltage of up to fifty percent. The AVEF is characterized by an annular void for obstructionless flow and by perturbations of an impressed electromagnetic field in which the field is altered as a result of an expanding fluid. The electromagnetic field is generated by an axial or a longitudinal coil. The AVEF has the attributes of a tunable impedance in which fluid force alters the electronic response of a resonant circuit. Fluids can flow through the flowmeter in either direction at widely differing flow rates. Flow rate measurements can be adjusted to record actual or relative flow rate. Longitudinal coils permit the primary device of the AVEF to remain fixed in place while the secondary device of the AVEF is removed. As a result, the secondary device is portable and can be used with many primary devices in a fluid system. The operation of the mechanical and the electronic components of the primary and secondary devices can be validated without fluid flowing through the apparatus. When the diameter of the annular region of the flowmeter is greater than or equal to the diameter of the fluid conduit system, fluid flows without obstruction, with the result that the pressure drop across the flowmeter is minimal and equivalent to the pressure drop across a similar section of conduit. A further aspect of the flowmeter relates to the measurement of a fluid that may consist of multiple phases.

20 Claims, 8 Drawing Sheets

ANNULAR VOID ELECTROMAGNETIC FLOWMETER

CROSS REFERENCE TO RELATED APPLICATIONS

U.S. Provisional Patent Application Title: Annular Void Electromagnetic Flowmeter, application Ser. No. 60/356,100, Filing date Feb. 09, 2002.

REFERENCE TO FEDERALLY SPONSORED RESEARCH

Not applicable

REFERENCE TO A COMPUTER PROGRAM LISTING APPENDIX

Not applicable

FIELD OF INVENTION

This invention relates to flowmeter and more particularly to electromagnetic flowmeter measurement of either magnetic or non-magnetic, compressible or incompressible fluid flow in a steady or transient fluid state, when fluid flow is characterized as single-phase or multi-phase, including combinations of gases, liquids, vapors, particles, and/or emulsions, and when fluid flow is either forward or backward through a flowmeter, so that obstructionless fluid flow measurements can be made.

BACKGROUND OF THE INVENTION

Fluid flowmeter for many applications already exist. Flowmeter are devices that measure the rate of flow or the quantity of a moving fluid in an open or a closed conduit. They are characterized as consisting of a primary device and a secondary device. The primary device is mounted internally or externally to a fluid conduit. A primary device produces a signal generated by the interaction of the fluid with the physical configurations or manifestations of the device. The secondary device responds to the signal from the primary device and converts that signal into a display or other presentation to indicate flow rate. Flowmeter are fabricated from various materials and constructed in different configurations. Both the primary and secondary devices use a variety of physical means to identify the flow rate of a fluid through a conduit.

Several variables determine how a fluid flowmeter is constructed and used. These variables include, type of fluid; temperature and pressure limits, steady-state, pulsating, or transient fluid flow, range of flow measurement, pipe size; flow conditioner size; length of meter runs to generate stable flow before measurement; surface roughness; number of blades internal to a turbine flowmeter; friction forces; springs; pistons; floats; and other mechanical configurations, such as cones; tubes; and targets. In addition to these variables affecting fluid flowmeter construction and application, costs related to installation and to fluid-flow pressure drop across the meter must be considered. A pressure drop across the meter requires more pumping energy and therefore generates higher fluid pumping costs, especially in large diameter conduits.

There are fluid flow obstruction problems associated with flowmeter applications. These obstruction problems include poorly configured conduit systems, fittings, and other physical devices that may generate an obstruction in the path of a moving fluid. Within the existing range of technologies for fluid flow measurement, most obstructions adversely affect fluid measurement even while generating primary device signals. All obstructions generate a pressure drop within the fluid system.

Fluid flowmeter are also classified as differential producers or linear scale meters. Differential producers include orifice meters, target meters, venturi meters, flow nozzles, low-loss meters, pitot tube meters, and elbows. Linear scale meters include magnetic flowmeter, positive displacement meters, turbine meters, ultrasonic meters, variable area meters, and vortex meters.

The few fluid flow measuring technologies that do not use obstructions include ultrasonic signal and electromagnetic field signal evaluation. Ultrasonic flowmeter that use ultrasonic transmitters and receivers are placed externally to a conduit to sense the change in time of transmitted and received ultrasonic signals within a fluid. The variation in time for the transmitted and reflected signals is translated into fluid flow rate. Doppler flowmeters, another type of ultrasonic flowmeter, reflect the flowing fluid pressure front to a detector by particulate matter in the fluid. The difference in a doppler meters' reflected frequency and fixed frequency is related to the flowing fluid rate. Obstructionless flowmeters also include electromagnetic fluid flowmeters that are based upon the principle of electromagnetic induction. These flowmeters average the velocity of the fluid over the conduit area. Measured fluids must have adequate magnetic properties so that the fluid will support an electromagnetic field.

The measurement of compressible fluids over short time periods when the fluid is in a transient state is an extraordinarily complex problem that is not specifically addressed by existing flowmeter technologies. As a result, both historically and practically, fluid dynamic measurements concentrate on steady-state flow rates where averages of the fluid flow are determined. Instantaneous fluid flow measurements are not often made due to the wide variety of disturbances that can affect the fluid flow rate and due to slow time constants in conventional flowmeters. For example, in most industrial applications, pulsation and transient behavior are considered to be undesirable flowing fluid properties. Pulsation dampeners are often used in fluid systems to decrease pulsation effects and fluid capacitances and fluid accumulators are used to further reduce transient fluid flow behavior. Thus, the measurement of fast-transient fluid flow, and correspondingly, steady-state fluid flow are not dual design parameters in current flowmeters. As a result, current technology is directed to flowmeters that measure average, continuous, steady-state flow rates.

Swirling flow is a common deleterious effect in gas flow measurements. Swirling is caused by elbow fittings out of plane in pipelines. Swirling creates additional measurement problems for common flowmeters such as orifice plate, turbine, and vortex meters, which require relatively undisturbed flow profiles to generate reproducible, reliable, and accurate measurements. Improvement in the measurement of swirling gas flow rates has been reported for the v-cone flowmeter. The v-cone meter is an obstruction, differential pressure, flowmeter in which a cone is placed in the fluid flow path.

The patent literature includes the description of a number of fluid flow measuring devices that address mechanical motion associated with magnetic followers to indicate the conditions of fluid flow. Among the patents is U.S. Pat. No. 3,805,611 to H. A. Hedland (1974) that teaches a single magnetic piston, a conical interior unit to modify fluid flow rate, and a magnetic follower, exterior but concentric and contiguous to the flowmeter housing, to track the mechanical position of the internal magnetic piston and to show flow rate on a mechanical scale. U.S. Pat. No. 3,805,611 represents a beneficial fluid flowmeter with a number of practical advantages. However, the Art taught in U.S. Pat. No. 3,805,611 suggests that fluid flow is not impeded by internal components in the path of a flowing fluid. This description contradicts the known laws of physical science, which require a pressure drop across any passive annular fluid device through which fluid flows. However, this minor discrepancy in description does not affect the practical application of Hedland's flowmeter that has been used in many flow measurement environments in the petroleum industry.

The issue of pressure drop associated with flow rate measurement is an important issue that affects the manner in which flowmeters operate. Pressure drop across a fluid flow rate measuring element is especially important when considering explosive, instantaneous, transient, or fast periodic fluid flow rate measurement.

As a result of the focus of prior Art on steady-state fluid flow measurements, current methods to acquire fluid flow rate data for explosive, fast, non-steady-state, moving fluids suffer a number of disadvantages when addressing fluid flow rate variation, including the disadvantages listed below.

[1] Prior Art in measurement of fluid flow rate focuses upon thermodynamic steady-state conditions of flow and does not specifically address transient and other non-steady-state conditions as the primary focus of fluid flow measurement.

[2] Because existing flowmeters do not focus on explosive, transient, and fast non-steady-state fluid flow measurement, their accuracy and precision are compromised.

[3] Existing obstructionless flowmeters, such as ultrasonic flowmeters, require added installation space around the fluid conduits.

[4] Primary device design in conventional flowmeters that use mechanical components permits measurement of fluid flow in only one direction.

[5] Inertia associated with flowmeters having mechanical blades generates long time constants when such devices measure flow rate, and thus prevents these flowmeters from measuring short duration fluid flow rates accurately.

[6] Because existing flow measuring technology focuses upon steady-state fluid flow, piping systems require flow conditioners and/or long pipe runs to generate suitable conditions for flow measurement.

[7] Current flow measuring technology is an averaging technology that focuses upon averaging flow before measurements are taken rather than after measurements are taken.

[8] Current flow measuring technologies that use a magnetic field response require, either a fluid that will support a magnetic field as the measured medium, or a magnetized component and magnetic follower to generate a primary response for flow rate.

[9] Current flow measuring technologies that generate a pressure drop across the measuring device, such as orifice meters, v-cone meters, critical flow nozzle meters, and venturi meters, measure flow rate with a restricting flow geometry that reduces the area of a flow orifice in order to generate a pressure difference related to fluid flow rate.

[10] There are no broadly applicable flowmeters that use electromagnetic field strength variation to measure the flow rate of non-magnetic-field-supporting fluids.

[11] No methods are available to check calibration, to recalibrate, or to validate operation of flowmeter primary and/or secondary devices in field installations without using either a flowing fluid for calibration and/or removing the flowmeter for bench-calibration.

[12] Existing flowmeter technology uses an electrical, an electronic, or a mechanical method for calibration and does not provide for an approach in which amplitude and frequency of an electronic signal and the mechanical position of an electrical coil or coils are combined for calibration purposes.

[13] Existing flowmeters are not based upon a resonant electronic circuit.

[14] The time constant of a conventional flowmeters is not usually specified because fluid flow rate measurements are conducted in steady-state environments.

[15] The expansion of fluid is not a principal focus for measureing fluid flow.

[16] Existing flowmeters for multi-phase fluids do not use fluid expansion and contraction chambers and obstructionless geometry to produce a primary signal that is generated from a change in density of a multi-phase fluid.

SUMMARY OF THE INVENTION

In accordance with the principles of the disclosed invention, defined as, Annular Void Electromagnetic Flowmeter [AVEF], the characteristics of operation that distinguish this invention from prior Art are described below.

(a) An electromagnetic field measurement upon which fluid flow is based permits the physical, internal, components of the AVEF to be used with standard pipe components when such components are appropriately modified.

(b) There may be no fluid flow obstructions introduced into the fluid system by the measuring device. The absence of obstructions dictates that a threshold of fluid flow exists before the AVEF will respond to fluid flow. The minimum response of my AVEF is therefore dependent upon the amount of flowing fluid, the physical properties of the fluid, the physical configuration of the flowmeter, and the physical properties of the components within the flowmeter.

(c) Transient or steady-state fluid flow measurements are determined by the same physical configuration. In transient fluid flow measurements, the time constant of my AVEF is on the order of magnitude of $10^{-3}$ seconds (0.001 seconds) which permits measurement of rapidly expanding and rapidly compressing fluids through the flowmeter.

(d) Measurement of fluid flow rates by my AVEF depends upon changing an electromagnetic field but does not require a fluid that supports a magnetic field.

(e) My AVEF includes one or more pistons fabricated from ferromagnetic material or other material that supports a magnetic field, with a void through the piston(s), which void may be smaller than, equal to, or greater than the diameter of the fluid system conduit. The void may be any shape sufficient to permit fluid flow through the piston(s). When such void is at least equivalent to the void though the related conduit system that is used to convey the flowing fluid, the piston(s) produce obstructionless flow. The preferred embodiment of the void is an area of the same size as the conduit though which the fluid is flowing.

(f) My AVEF includes a means to reposition piston(s) moved by fluid flow. When fluid flow changes, the piston(s) may be repositioned to a greater or lesser flow-rate position or to a zero flow-rate position, depending upon the fluid flow force on the face of the piston(s).

(g) My AVEF includes a housing for the piston(s) and for the means to reposition piston(s). A non-magnetic material is preferred for the repositioning means.

(h) My AVEF contains one or more electrical coils positioned externally to the housing, either axially around the housing at a right angle to the internal piston(s), or bent into a longitudinal or oval shape placed parallel to the piston(s) and contiguous to the housing, with the coil(s) having the capability to sense a change in electric current impressed on the coil(s) when a piston that supports a magnetic field moves toward or away from the coil(s). When a coil is positioned axially with respect to the housing, when the inside diameter of the coil and external diameter of the housing are the same, the coil is next to the housing. If the inside diameter of the coil is larger than the outside diameter of the housing, the coil is placed away from the housing. In either case, the magnetic field generated by the coil will be altered by the movement of a piston made from material that will support a magnetic field, which movement changes the impedance of the coil and, correspondingly, the current associated with the electromagnetic field.

(i) My AVEF includes a metal shield-cover that encloses the coil(s) and the housing, described in (h) above. The cover shields internal components from external electromagnetic fields, and contains the internal electromagnetic field generated by the coil(s).

(j) My AVEF primary device includes a housing, a piston or pistons, and a means to reposition the piston(s) in the housing.

(k) In a two-piston configuration of the primary device, the zero point of one piston may be placed at one end of the housing with the zero point of the other piston placed at the other end. In this configuration, fluid can enter the flowmeter from either end of the housing. A single repositioning means acts upon the two pistons simultaneously; a double repositioning means acts upon each piston separately.

(l) My AVEF secondary device includes coil(s); electronic components needed to generate an electronic signal impressed upon the coil(s), amplification and noise control circuits to detect modified electric current in the coil(s) from piston motion; and a display of the voltage generated, calibrated to reflect fluid flow through the flowmeter.

(m) The flowmeter secondary device includes a means to change the amplitude and frequency of the signal impressed upon the coil(s) to fix a resonant, or near resonant, operating point for detecting fluid flow rate.

(n) Fluid flow rate can be calibrated to reflect either a positive or negative response to the motion of the piston(s). With certain electronic circuit settings of the secondary device, and placement of the coil(s) with respect to the piston(s) of the primary device, positive or negative responses can be obtained. By design, a relative zero can be set at a specific flow rate, so that a positive response is generated in one direction and a negative response is generated in the opposite direction from the relative zero. The preferred response is positive for a positive piston displacement toward the coil(s).

(o) With certain geometrical configurations of the flowmeter coil(s) and housing, when a ferromagnetic material is placed next to a coil, the flowmeter response of the secondary device can be verified by moving the ferromagnetic material.

(p) The linear position of the flowmeter coil(s) on the flowmeter piston housing can be adjusted for sensitivity and calibration from outside the shield-cover. This permits adjustment of the coil(s) without removing the cover.

(q) The strength and polarity of the signal obtained from movement of the piston(s) depend upon the position of the coil(s) relative to the piston(s) and upon the impressed frequency on the coil(s) relative to the resonance frequency of the resonant circuit.

(r) At each end of the flowmeter housing, end-fittings ensure pressure integrity of the housing and provide a stop for each end-piston inside the housing. Each end of the housing also includes a fluid expansion or contraction chamber (e/c chamber) that is conical or cylindrical in shape. Depending upon flowmeter design, an e/c chamber may be in the housing or in the end-fitting. When upstream fluid reaches a first e/c chamber, fluid expands and density decreases momentarily, generating force on an upstream piston frontal area. Upon leaving the housing, fluid encounters a second e/c chamber wherein the fluid undergoes contraction and the original fluid density is recovered. When a steady-state fluid flow pushes on the frontal area of the piston, the piston will achieve a position of equilibrium created by the force of the fluid on the piston and the opposing force of the restoring means. The preferred means for repositioning the piston is a spring of appropriate length, diameter, stiffness, and non-magnetic material. When fluid flow is in a transient state, the piston will move from one equilibrium position to another, depending upon the initial and final flow rates that create the transient flow. If the initial and the final flow rates are zero, transient flow will cause a piston to move away from and return to zero. If a transient state is short, the piston will move in a pulse manner. If a change in state is sufficiently long, the piston will move to an equilibrium position, and steady-state flow rate can be measured between periods of transient flow.

A certain threshold level of fluid flow through my AVEF must be achieved before the fluid will expand with sufficient force to move piston(s). The threshold level of fluid flow generates a corresponding threshold of detection of the flow. This threshold of detection depends upon a number of physical variables, including: (i) force generated by the flowing fluid; (ii) pressure associated with the flowing fluid; (iii) geometry of the flowmeter housing; (iv) geometry and mass of the piston; (v) friction forces associated with the sliding piston in the housing; (vi) damping associated with piston movement; (vii) fluid compressibility; (viii) fluid density; (ix) e/c chamber dimensions; and, (x) force generated by a restoring means. For example, with all variables except the piston repositioning spring held constant, different spring constants create correspondingly different thresholds of detection of fluid flow for the same fluid, flowmeter housing, piston(s), and e/c chambers.

The electromagnetic field generated by the coil(s) is altered by piston movement. This electromagnetic field exists both externally and internally to the flowmeter housing. The movement of a ferromagnetic piston alters the strength of this field and changes the impedance of the resonant coil-capacitor circuit. A given displacement of a non-magnetized piston generates a steady-state response that can be used to measure fluid flow rate. For the same piston displacement, a magnetized piston generates a transient response that cannot be used to measure fluid flow rate.

It is therefore to be understood that the objects of the present invention are

[1] to provide an apparatus to measure fluid flow rate with no obstructions in the fluid path so that only customary pressure drops in a fluid system of conduits and components are present, thereby eliminating back pressure and using a lower amount of energy to move the fluid;

[2] to provide an apparatus to measure fluid flow rate when the rate is explosive, transient, and/or of very short time duration, as well as to measure fluid flow rate when the rate is in steady state, thereby permitting transient rates to be compared to steady-state rates through the same fluid system using the same measuring apparatus;

[3] to provide an apparatus to measure fluid flow rate under minimum energy input conditions, such that the apparatus can measure rates at low capacities and high pressures, at low capacities and low pressures, at high capacities and high pressures, and at high capacities and low pressures;

[4] to provide an apparatus to measure fluid flow rate in equipment wherein there is insufficient room to include flow-conditioners and/or long conduits upstream and downstream of a measuring device, thereby providing a means to measure fluid flow rates in places where such measurement is difficult;

[5] to provide an apparatus that contains a minimum number of parts to maximize the reliability and minimize the cost of the apparatus;

[6] to provide a mechanical means to verify the operation of the AVEF and to validate the electronic calibration of the apparatus in the field, without having to shut down the fluid system to remove the AVEF for calibration and without requiring technical expertise in setting electronic calibration gains; and,

[7] to provide a flowmeter that can be calibrated with respect to density of multiphase fluids when such multiphase fluids cause a piston to move differentially with respect to fluid density and fluid pressure.

In a preferred embodiment, my AVEF has a metal shield-cover. The apparatus has a pressure and fluid containment housing constructed of non-magnetic material containing non-magnetized piston(s) and non-magnetic repositioning spring(s). Fluid force on a piston face pushes a piston against the spring. With a lesser fluid force on a piston face, a piston is pushed back by the spring. When fluid force on a piston face is absent, the spring places the piston at a zero flow rate position. Fluid force is distributed on a piston face by an e/c chamber that can be any shape sufficient to allow fluid to expand against the frontal area of the piston.

A piston void can have the same dimensions as the fluid conduit to permit obstructionless fluid flow and thereby eliminate or significantly reduce back pressure. Fluid expansion in an e/c chamber permits a flowing fluid to impact a larger area of a piston face than the fluid would impact in the absence of this chamber. Thus, the e/c chamber permits the dimensions of a piston void to be the same as the dimensions of the conduit. If there is no e/c chamber, in order for a piston to move, the piston void must have a cross-sectional area smaller than the area of the conduit; this design obstructs fluid flow and generates back pressure.

A piston is constructed of ferromagnetic or paramagnetic material. One or more coils are placed axially or parallel to the direction of piston travel. An electrical signal is impressed on the coil(s) located exterior to the non-magnetic housing, so that a piston moving inside the housing causes a change in the magnetic lines of flux associated with the magnetic field generated by the coil(s). The change in magnetic flux caused by a moving piston becomes a constant when the piston moves from one position to another and, thereafter, does not move. A periodic fluid force on the face of a piston will move the piston back and forth, causing either an increase and decrease, or a decrease and increase, of magnetic flux. The electrical signal impressed upon the coil will respond similarly. The electrical signal will be represented by either a change in voltage amplitude or a change in current amplitude.

Voltage or current amplitude changes generated by a moving piston provide a response that is dependent upon the amplitude and frequency of the electrical signal imposed upon the coil(s) and upon the position of the coil(s) relative to the piston(s). In the preferred case of selecting voltage amplitude change as the method to identify fluid flow rate, a reference frequency is chosen in the region of the resonant frequency of the resonant circuit. A moving piston causes a change in the voltage amplitude of this reference frequency. Depending upon which side of the resonant frequency a reference frequency is chosen, and upon how coils arc placed with respect to pistons, the voltage amplitude from piston motion will either increase or decrease with respect to the reference frequency, voltage amplitude. Thus, for voltage amplitude changes associated with a given direction of piston motion, the direction and amount of change of the voltage are functions of the reference frequency, the resonance frequency, the resonant peak voltage amplitude, the inductance in the resonant circuit, the capacitance in the resonant circuit, the proximity or distance of the coil(s) to the piston, the orientation of the coil(s), and the type of metal used in the housing.

The preferred embodiment includes a coil of wire with resistance in the range of 600 to 2500 ohms, a reference frequency less than 4000 hertz, a reference voltage amplitude that is 90 percent of the maximum resonant voltage amplitude, and a metal shield-cover installed over the piston housing and coil(s), so that the coil and housing are shielded. The latter geometry permits the coil(s) to be moved in linear relation to the direction of piston(s) motion. The voltage amplitude may therefore increase or decrease depending upon whether a piston is moving out of or into an electromagnetic field when the piston is moving in only one direction. Non-magnetized ferromagnetic and paramagnetic materials will generate these results. In the voltage amplitude mode of operation, only non-magnetized materials will provide a constant voltage amplitude for a constant position of a flowmeter piston.

The preferred embodiment of the AVEF uses non-magnetic stainless steel [ss] (ss 304 or ss 316) for the housing, a metal or a composit metarial for the coil shield-steel cover, and stainless steel (ss 417) for the piston(s). Other materials that upport a magnetic field can also be used for the piston(s) such as non-magnetized iron or composite materials. In one embodiment, the flowmeter housing is constructed from a six-inch section standard stainless steel pipe. Appropriate end connectors or fittings secure the flowmeter piston(s) and provide pressure integrity.

Further objects and advantages will become apparent from consideration of the following descriptions and drawings.

BRIEF DESCRIPTION OF THE DRAWINGS

My AVEF, its combinations and connections, and its principles of operation will be more fully understood from the description given below with reference to the detailed description of the preferred embodiment and accompanying drawings in which like reference numerals identify like elements in different figures, and in which related figures and elements have the same number but different suffixes.

DETAILED DESCRIPTION OF THE DRAWINGS OF THE INVENTION

FIG. 1, FIG. 1A, FIG. 2, and FIG. 3 should be understood to represent schematics or sketches of my AVEF apparatus and to show a general physical configuration of the flowmeter primary and secondary devices that convert fluid flow rate detected by piston motion into a signal that can be shown on a digital display or computer monitor.

Figure 1:
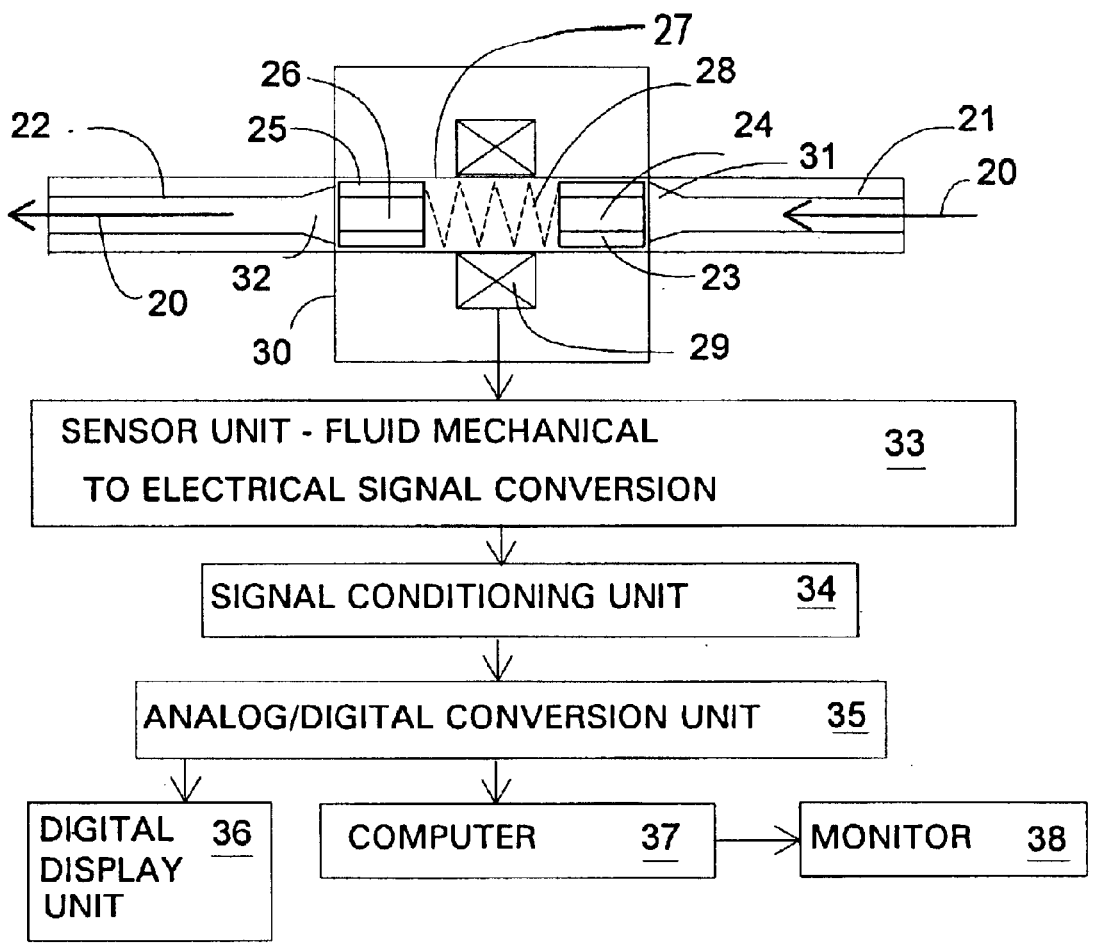
FIG. 1 shows a schematic diagram of my AVEF with two pistons, a coil in axial position with respect to piston motion, and a block diagram of the transformation of fluid motion into electronic signals to measure fluid flow rate, displayed on a conventional digital display unit and/or on a computer monitor.

FIG. 1 schematically illustrates a fluid 20 flowing into flowmeter entry pipe 21 and the same fluid 20 flowing out of flowmeter exit pipe 22. Fluid 20 passes through the flowmeter apparatus, schematically described by a first piston 23 with void 24 and a second piston 25 with void 26, each positioned inside flowmeter housing 27; and by piston repositioning spring 28, coil 29, shield-cover 30, inlet e/c chamber 31, and outlet e/c chamber 32. FIG. 1 further shows a sensor unit 33 to convert fluid mechanical motion into an analog electrical signal, a signal conditioning unit 34 for the electrical signal, an analog to digital conversion unit 35 to change the signal into a digital electronic format for a digital display unit 36, and a computer 37 with monitor 38.

Secondary device electrical and electronic units 33, 34, 35, 36, and 37 provide means to convert fluid motion, detected by the magnetic coupling of piston 25 or 26 and coil 29, into a signal for digital display unit 36 and computer monitor 38.

Figure 1A:
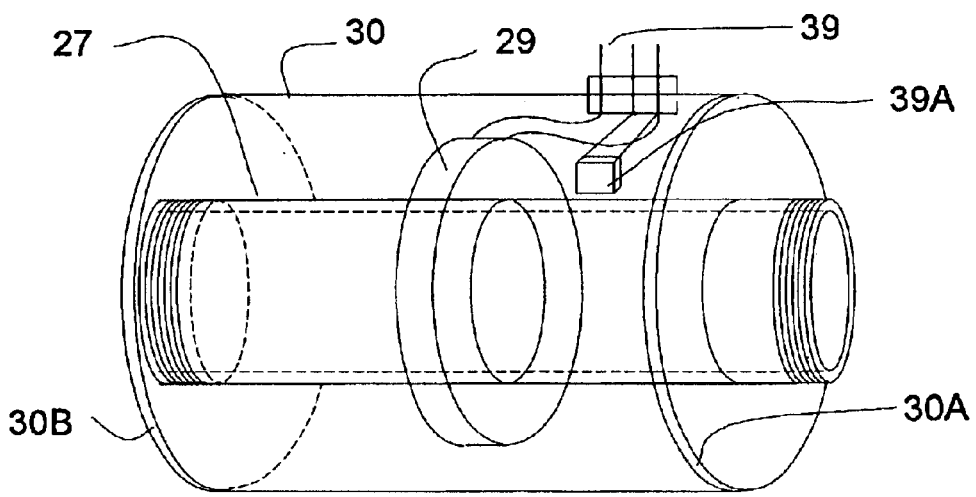
FIG. 1A shows a partial schematic diagram of my AVEF, including a housing for internal pistons, an axial coil, a coil shield-cover with end plates, electrical leads, and a capacitor configured for either a parallel or a series resonant electronic circuit.

FIG. 1A schematically shows a portion of my AVEF, comprising shield cover 30 with first shield-cover end plate 30A and second shield-cover end plate 30B, coil 29 axially positioned on flowmeter housing 27, a wire connector 39, and a capacitor 39A. Capacitor 39A is placed with coil 29 for convenience. The microfarad value of capacitor 39A may be changed to establish a different resonant frequency, depending upon the electrical properties of coil 29. An alternative flowmeter embodiment places capacitor 39A in the circuit of the secondary device sensor unit 33.

Figure 2:
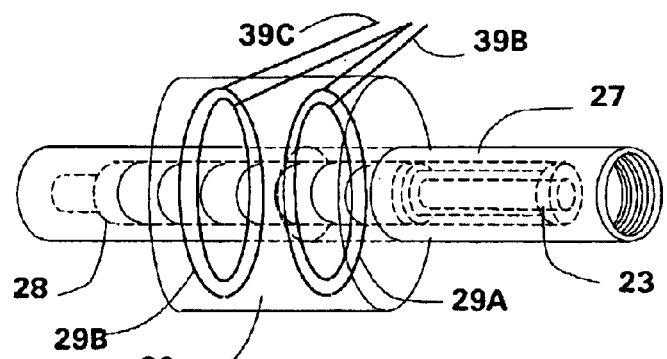
FIG. 2 shows a partial schematic diagram of my AVEF with a single piston, in which one or more connected coils are in an axial (right angle or perpendicular) orientation to the flowmeter housing.
Figure 3:
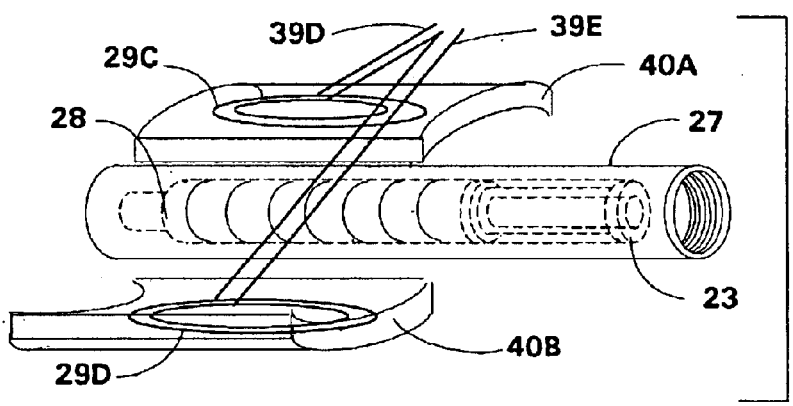
FIG. 3 shows a partial schematic diagram of my AVEF with a single piston, in which one or more connected coils are in parallel (zero angle or longitudinal) orientation to the flowmeter housing.

FIG. 2 and FIG. 3 show schematic representations of alternative embodiments of my AVEF [shown in FIG. 1].

FIG. 2 shows one or more axial coils 29A and 29B with coil leads 39B and 39C, respectively, positioned axially on housing 27. When fluid is flowing, piston 23 and piston repositioning spring 28 represent a fluid-mechanical subsystem that provides a measure of fluid flow rate through housing 27.

FIG. 3 shows one or more longitudinal coils 29C and 29D with coil leads 39D and 39E, respectively, positioned longitudinally on or parallel to housing 27 with internal piston 23 and piston repositioning spring 28. First shield-cover 40A and second shield-cover 40B protect the longitudinal coils from stray electromagnetic fields.

Figure 4:
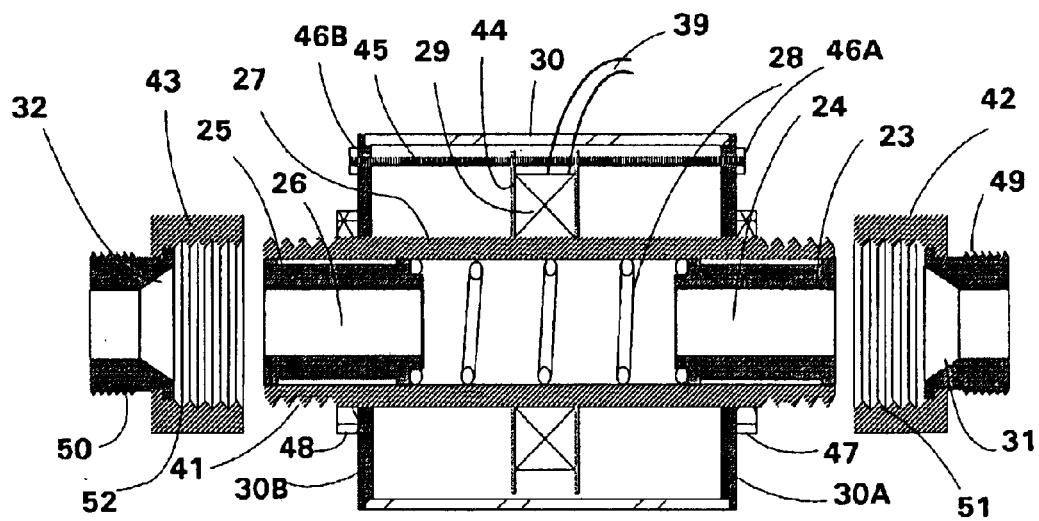
FIG. 4 shows my AVEF with two pistons, two end caps that screw onto a flowmeter housing, a fluid expansion or contraction (e/c) chamber in each end cap, piston repositioning spring, coil, coil spool, coil positioning means, and coil shield-cover.

FIG. 4 shows my AVEF, with housing 27 containing pistons 23 and 25, repositioning spring 28, fluid expansion e/c chamber 31, and fluid contraction e/c chamber 32 (with fluid flow from chamber 31 to chamber 32). Housing 27 has threads 41 on each end to permit flowmeter end caps 42 and 43 to screw onto housing 27, forming a pressure-tight fluid seal and providing a stop for pistons 23 and 25. End caps 42 and 43 are machined to include e/c chambers 31 and 32, external threads 49 and 50, and internal threads 51 and 52. Depending upon which end fluid enters housing 27, fluid will expand in either e/c chamber 31 or 32, exerting force on the face of piston 23 or of piston 25, causing the upstream piston to slide within housing 27. Because the fluid flows in only one direction through housing 27, only one of the two pistons will move within the housing. If the fluid flow is steady, piston 23 or piston 25 will reach an equilibrium position defined by the force of the fluid on the piston face and the restoring force of repositioning spring 28. When fluid flow stops, piston 23 or piston 25 will return to a zero position, stopped by cap 42 or cap 43.

FIG. 4 also suggests that if a fluid only partly fills voids 24 and 26, fluid will flow through housing 27 without causing piston 23 or piston 25 to be displaced from a rest position. For a piston to move, fluid must fill an incremental volume of the entry and exit pipes. When fluid fills such an incremental volume, a threshold force is established on the face of piston 23 or of piston 25 to move the piston against the restoring force of repositioning spring 28.

FIG. 4 further illustrates a means for coil 29, which is wrapped inside coil spool 44, to slide axially on housing 27. Coil 29 and spool 44 are covered by shield-cover 30 and shield-cover end plates 30A and 30B. The position of coil 29 on housing 27 is adjusted by coil-repositioning screw 45, which incrementally moves spool 44 laterally on the housing. Coil screw 45 is screwed through spool 44 and held by end nuts 46A and 46B, so that the screw will rotate between the shield-cover end plates, while moving the coil and spool axially and laterally on the housing. The shield-cover and end plates are anchored on each end of the housing by securing means 47 and 48, respectively. The securing means are fixed to the housing by set screws or similar fasteners (not shown). The securing means can also be made of a compressible material with sufficient thickness to secure the shield-cover and end plates on the housing by compression force from flowmeter end caps 42 and 43. The shield-cover and end plates are fixed to the housing in such a way that the cover end plates comprise a fixed reference for the sliding placement of spool 44 with coil 29 on the housing by screw 45.

When coil 29 contains an electrical current, this coil current and the strength of the electromagnetic field generated by the coil are altered as piston 23 or piston 25 moves inside housing 27. The lateral movement of coil spool 44 with coil 29 permits adjustment of the reference coil current. The reference coil current can be between zero and the maximum coil current, depending upon the coil position relative to the piston position. For example, if a piston moves toward a coil annulus, the electromagnetic field strength becomes more concentrated and the coil current decreases. As the piston moves, it may reach a point in the annulus at which the magnetic field strength and coil current are at a minimum. If the piston moves past the minimum point, the field strength and coil current will increase.

FIG. 4 also shows coil leads 39 that connect to an electronic circuit that converts a change in electromagnetic field strength and coil current into an electronic signal for display. It is to be understood from FIG. 4 that the primary device of my AVEF consists of housing 27, end caps 42 and 43, e/c chambers 31 and 32, pistons 23 and 25, and repositioning spring 28. It is to be further understood that the primary device generates a response from fluid motion for the secondary device to convert fluid-flow-rate force into a display of fluid flow rate. A portion of the secondary device of the flowmeter is also shown in FIG. 4. This portion of the secondary device includes shield-cover 30, end plates 30A and 30B, coil spool 44, coil 29, coil screw 45 with end nuts 46A and 46B, and shield-cover securing means 47 and 48 to hold shield-cover 30 in place so that the cover will not move laterally on housing 27.

Figure 5:
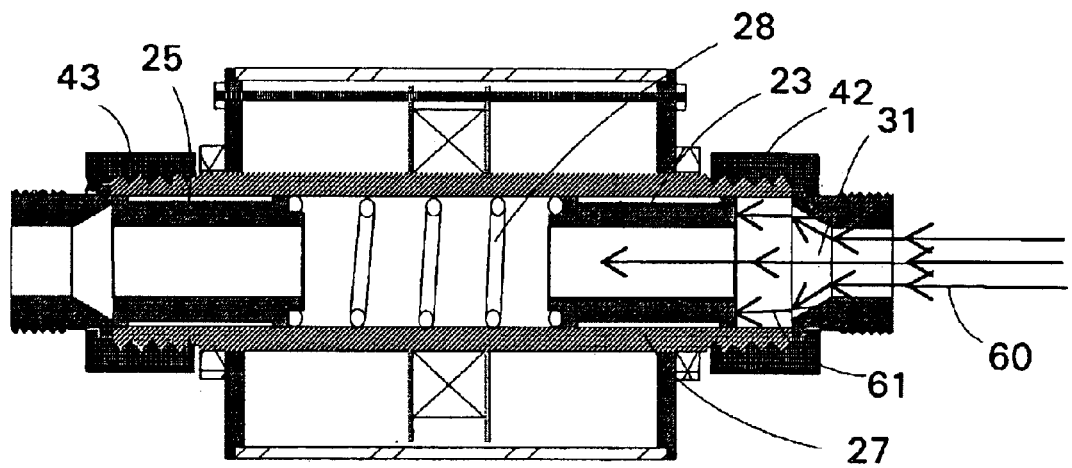
FIG. 5 shows my AVEF with piston movement caused by the expansion of fluid flowing through an expansion chamber.

FIG. 5 shows a sliding movement of upstream piston 23 caused by flowing fluid streamlines 60 that expand into an expanded fluid 61 in an extension of e/c chamber 31, which has been extended by the movement of the piston. Repositioning spring 28 is compressed by the action of flowing fluid 60. Upstream flowmeter end cap 42 and downstream flowmeter end cap 43 are connected to housing 27 so that a pressure seal is created between the end caps and the housing. End caps 42 and 43 also create a stop for pistons 23 and 25.

Figures 5A, 5B:
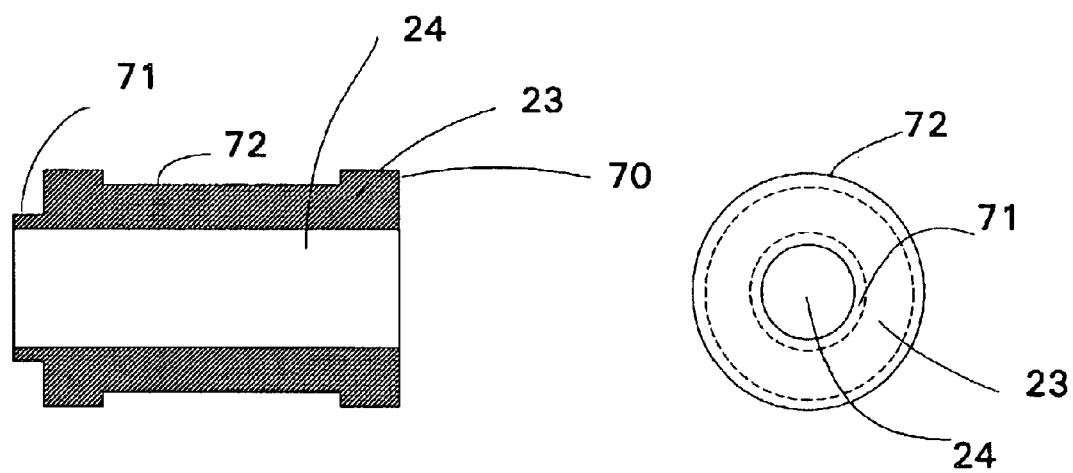
FIG. 5A shows a cross-sectional view of a piston.
FIG. 5B shows an end view of the piston shown in FIG. 5A.

FIG. 5A shows a cross-sectional view of piston 23 with void 24, piston face 70, recessed notch 71 to seat repositioning spring 28 [see FIG. 5], and drag recess 72 to reduce drag from piston movement.

FIG. 5B shows an end view of piston 23 with void 24, recessed notch 71, and drag recess 72.

Figure 6:
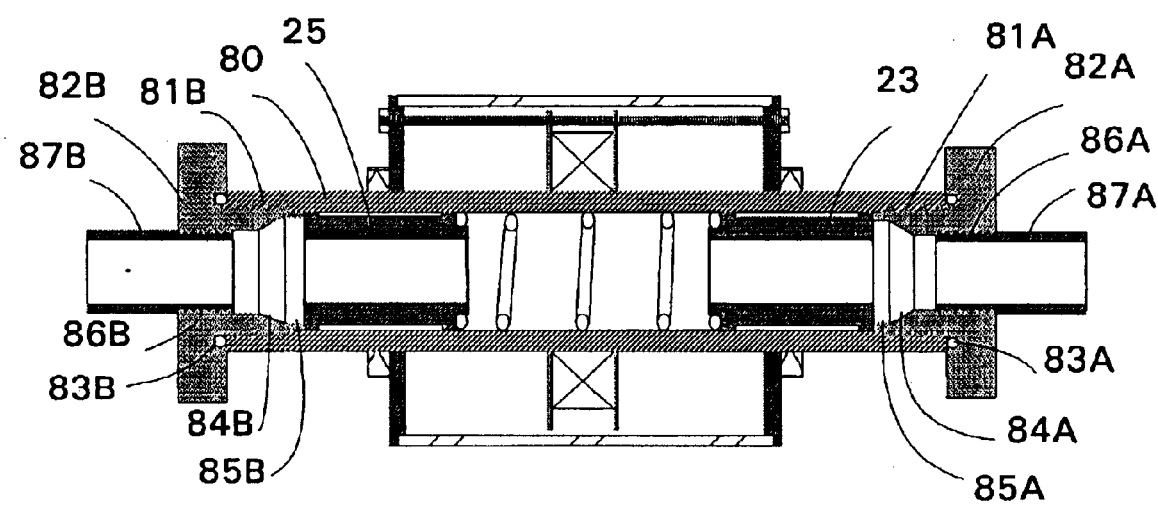
FIG. 6 shows my AVEF with two pistons, two piston-securing end plugs that screw into a flowmeter housing, an e/c chamber in each end plug, piston repositioning spring, coil, coil spool, coil positioning means, and coil shield-cover.

FIG. 6 shows another embodiment of my AVEF, in which piston-securing, hexagonal end plugs 82A and 82B, rather than end caps 42 and 43, provide pressure integrity and piston end stops. In this embodiment, flowmeter housing 80 has internal threads 81A and 81B into which are screwed end plugs 82A and 82B, respectively. "O" ring seals 83A and 83B form a pressure seal against the housing. End plugs 82A and 82B contain e/c chambers 84A and 84B and extended e/c chambers 85A and 85B, to permit an expanding fluid to exert force upon the face of either piston 23 or piston 25. The end plugs have internal threads 86A and 86B for connection of pipes 87A and 87B. Other AVEF components in FIG. 6 are the same as those in FIG. 4.

Figure 6A:
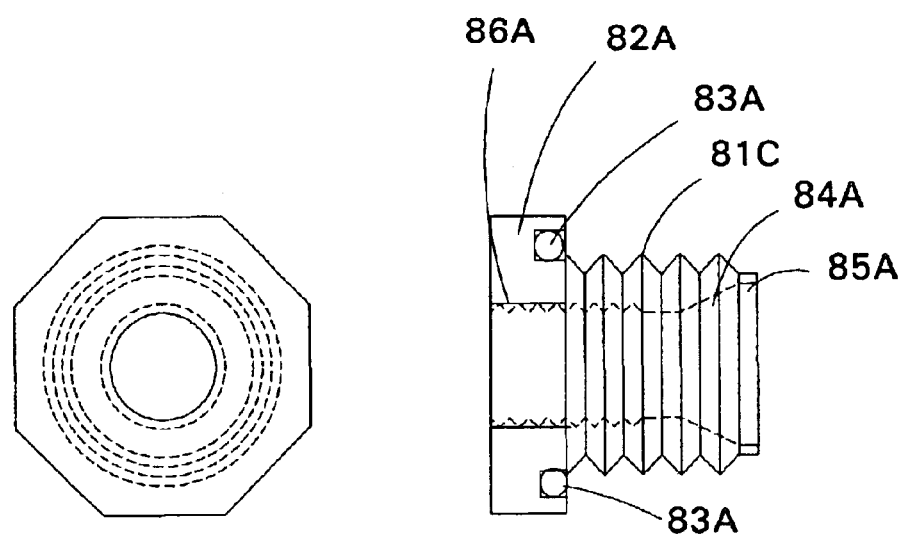
FIG. 6A shows end and side views of an end plug with an e/c chamber.

FIG. 6A shows an end and a side view of hexagonal end plug 82A with external male plug threads 81C, "O" ring seal 83A, e/c chamber 84A, extended e/c chamber 85A, and internal threads 86A. As shown in FIG. 6, threads 86A and 86B permit the flowmeter to be connected to an existing piping system.

Figure 7:
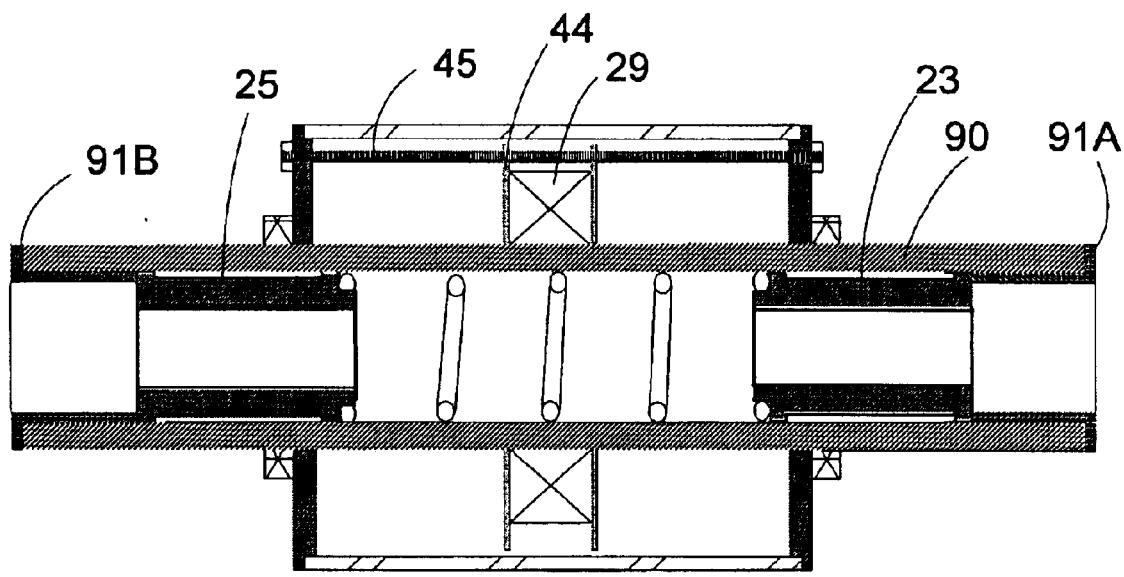
FIG. 7 shows my AVEF with a housing made of instrumentation tubing having a larger inside diameter than the tubing of the fluid conduit to which the apparatus is attached, spool with coil, coil screw, pistons, and spacers.
Figure 7A:
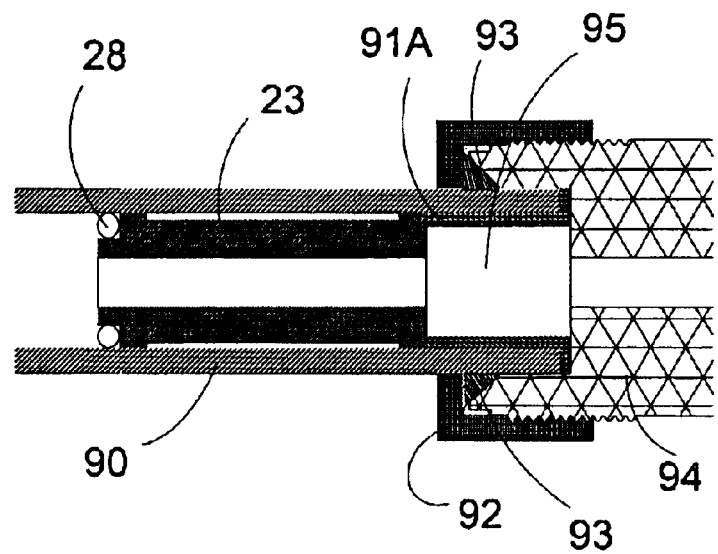
FIG. 7A shows a partial side view of the AVEF housing, made of instrumentation tubing, with a spacer, a piston, a compression sleeve, a compression sleeve locking nut, and a compression fitting connected to the housing.

FIG. 7 shows an embodiment of my AVEF that uses thin wall, stainless steel instrumentation tubing for housing 90. Referring briefly to FIG. 7A, compression fitting 94 connects the AVEF to an instrumentation tubing fluid system. In FIG. 7, spool 44 with coil 29 is positioned axially on housing 90 by coil screw 45, with pistons 23 and 25 recessed into the housing by spacers 91A and 91B. The spacers ensure that the pistons are positioned away from the ends of the housing, so that compression fitting 94 [FIG. 7A] will not immobilize a piston.

FIG. 7A shows a partial view of one end of my AVEF. Compression sleeve locking nut 92 and compression sleeve 93 are installed on housing 90. Compression fitting 94 is threaded into locking nut 92. When locking nut 92 is tightened onto the compression fitting 94 to form a pressure-tight enclosure, sleeve 93 compresses the tubing at the end of housing 90. Spacer 91A ensures that piston 23 will slide within the tubing without entering the compressed region. The combination of spacer 91A and compression components 92, 93, and 94 creates a stop for piston 23. Spacer 91A also creates instrumentation e/c chamber 95 through which fluid flows. Repositioning spring 28 ensures that piston 23 will rest against the spacer when fluid flows below the threshold flow rate required to slide the piston axially toward coil 29 [in FIG. 7].

FIG. 7A shows a configuration in which spool 44 with coil 29 [in FIG. 7] cannot be removed from housing 90. When locking nut 92 and compression sleeve 93 are secured by compression fitting 94 onto housing 90, the forces generated cause locking nut 92 to be held on the housing by sleeve 93, so that the nut and sleeve cannot be removed. When coil spool 44 with coil 29 is placed axially and contiguously on housing 90, the spool and coil cannot be removed or replaced, because the inside diameter of the spool is smaller than the maximum diameter of locking nut 92.

Figure 7B:
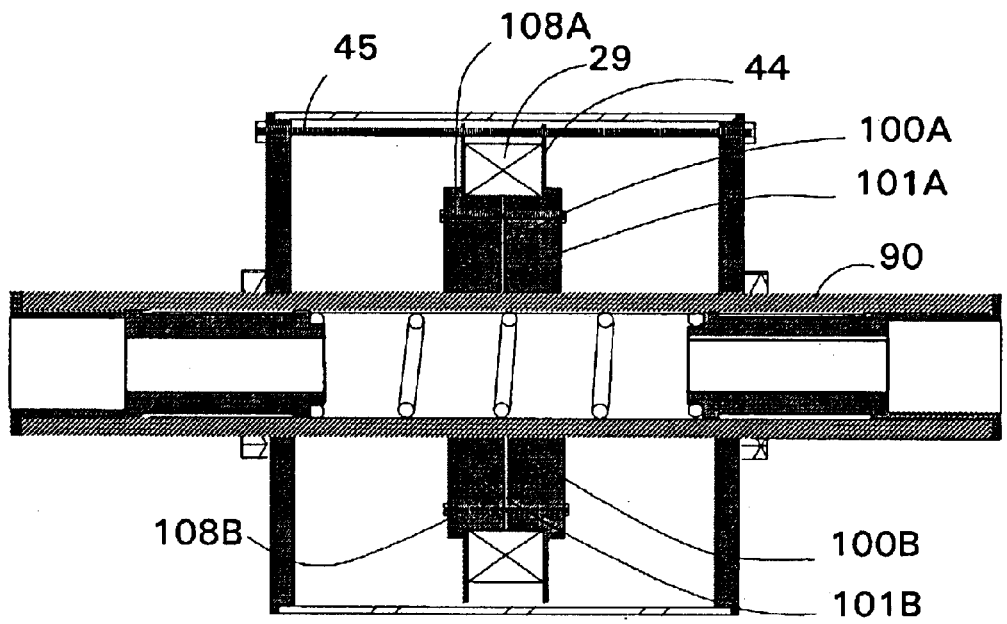
FIG. 7B shows my AVEF housing, made of instrumentation tubing, configured with two split-bushings that move a spool with coil further from the outside diameter of the housing, and that permit the spool of large diameter, with the coil, to be removed from the housing when compression locking nuts and compression sleeves are in place.

FIG. 7B shows an axial-coil configuration in which coil spool 44 with coil 29 can be removed from housing 90. The inside diameter of the spool is larger than the outside diameter of locking nut 92 [FIG. 7A], so that the spool with coil can slide over the locking nut for removal. Two non-magnetic split-bushings clamp the spool to permit the spool with coil to slide axially, but not contiguously, on the housing when coil screw 45 is rotated. In this configuration, the spool with coil must move axially so that the AVEF can be calibrated. The split-bushings are taken off in order for the spool with coil to slide over the locking nut.

The first split-bushing comprises upper part 100A and lower part 100B. The second split-bushing comprises upper part 10A and lower part 101B. Shafts 108A and 108B hold the pair of split-bushings together axially, thereby clamping spool 44 with coil 29 between the bushings.

Figure 7C:
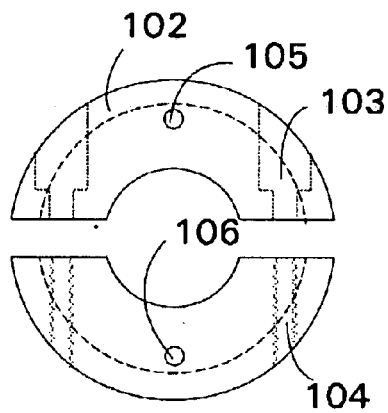
FIG. 7C shows an end view representative of a split-bushing.

FIG. 7C shows an end view representative of the upper and lower parts of a split-bushing, with coil recess 102, machine bolt recess 103, machine bolt threads 104, and holes 105 and 106.

Figure 7D:
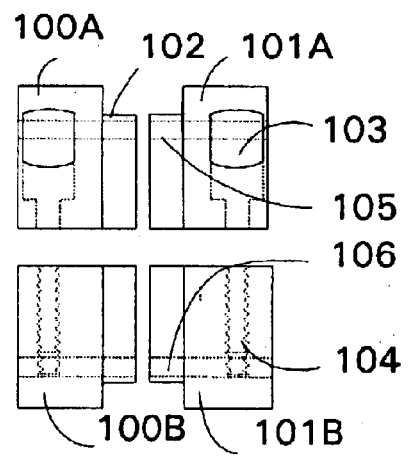
FIG. 7D shows a side view of upper and lower parts of two split-bushings.

FIG. 7D shows a side view of upper parts 100A and 101A and lower parts 100B and 101B of the split-bushings. Machine bolt recess 103 is drilled into the upper part and threads 104 are tapped into the lower part, so that a machine bolt 107 [FIG. 7E] can hold the upper and lower parts of a split-bushing together. Hole 105 is drilled through the upper part and hole 106 is drilled through the lower part, so that shafts 108A and 108B can pass through the holes to clamp the pair of split-bushings on each side of spool 44 with coil 29 [see FIG. 7B]. The spool with coil fits between the bushings and rests on coil recess 102.

Figure 7E:
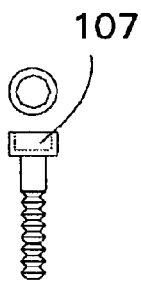
FIG. 7E shows a means to connect the upper and lower parts of a split-bushing.

FIG. 7E shows machine bolt 107, which is a typical means to secure the upper part to the lower part of a split-bushing. Four bolts are required.

Figure 7F:
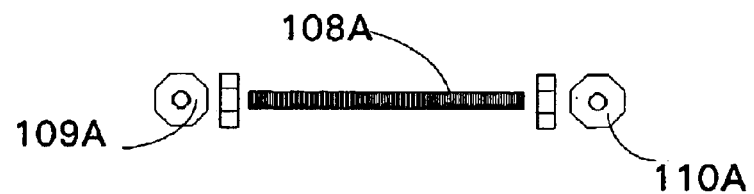
FIG. 7F shows a means to connect two split-bushings that clamp a coil and permit a coil be positioned on a flowmeter housing.

FIG. 7F shows shaft 108A with end fasteners 109A and 110A.

Figure 8:
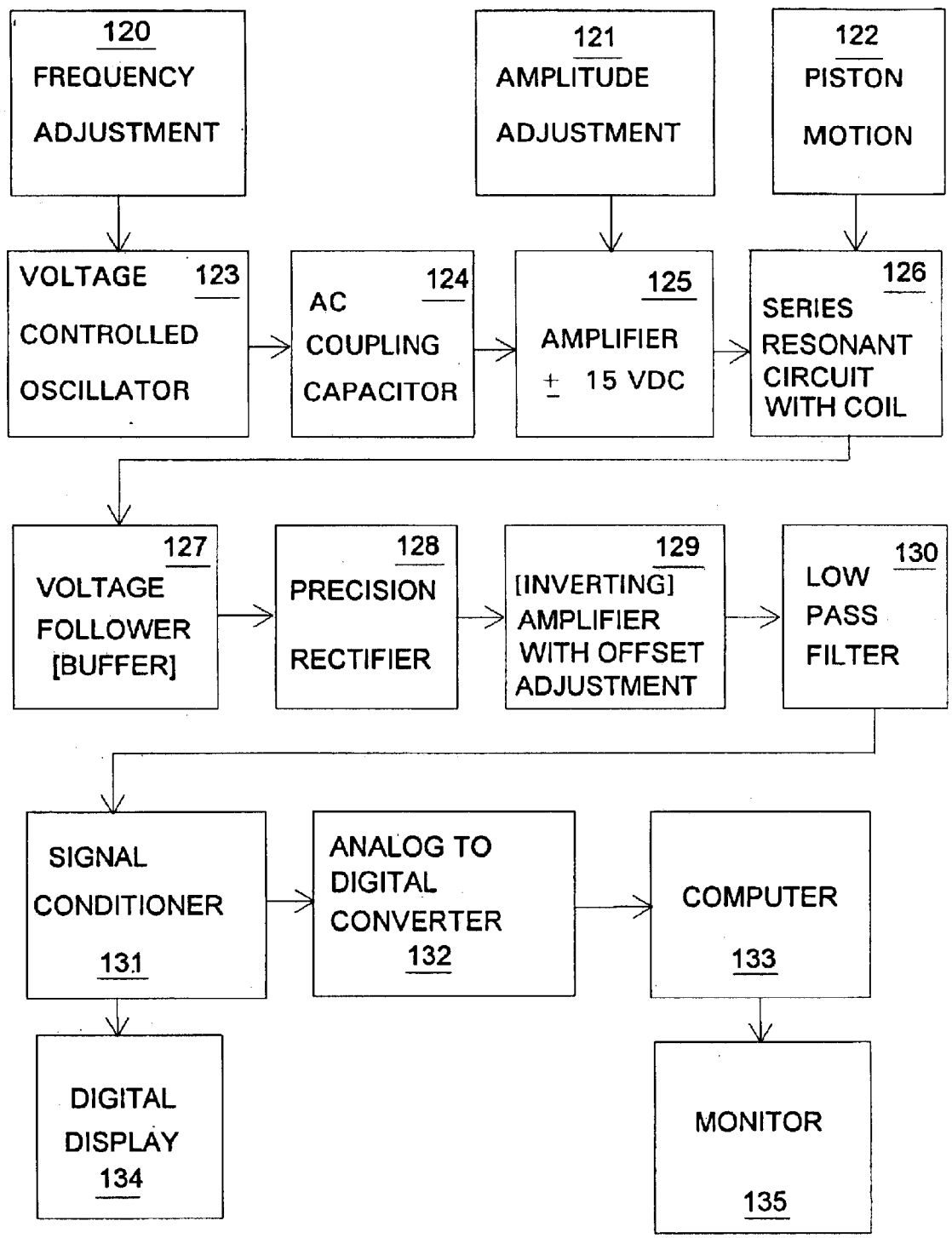
FIG. 8 shows a block diagram of electronic components and circuits of the secondary device of my AVEF that convert the primary motion of piston(s) generated by fluid flow into an electronic signal that indicates fluid flow rate.

FIG. 8 shows a block diagram of the electronic components and circuits of the secondary device of the AVEF. The secondary device converts primary motion of piston 23 or piston 25 [FIG. 4] into an electronic signal. FIG. 8 shows a series resonant circuit 126, consisting of coil 29 and capacitor 39A [FIG. 1A], from which variations in alternating voltage or current amplitude from piston motion are obtained. In the preferred embodiment, the coil voltage of the resonant circuit is used as the input to a buffer-amplifier, voltage follower 127. Alternatively, the series resonant circuit may be part of an operational amplifier circuit (not shown).

There are four inputs to the AVEF secondary device: alternating current [AC] frequency adjustment 120; AC amplitude adjustment 121; change in the electromagnetic field of a coil caused by piston motion 122, and offset voltage adjustment for the inverting amplifier 129 to establish a zero for the voltage amplitude that represents fluid motion. Voltage-controlled oscillator 123 is coupled to amplifier 125 by AC coupling capacitor 124 to provide a reference AC voltage for resonant circuit 126. Frequency adjustment 120 and amplitude adjustment 121 fix the reference AC voltage frequency close to the resonant frequency of circuit 126. Voltage across the inductance of the resonant circuit is sent to voltage follower 127 and subsequently to precision rectifier 128. The direct current [DC] voltage generated from precision rectifier 128 is further amplified and provided with a zero adjustment by inverting amplifier 129. The amplified DC signal is sent through low pass filter 130 to remove noise. Subsequently, the DC voltage signal is conditioned for amplitude by signal conditioner 131 and passed to analog-to-digital converter 132, to digital display 134, and to computer 133 for display on monitor 135.

For clarity, the following description of the preferred embodiment of the AVEF secondary device is in two parts. The first part explains the properties of the circuit that permit the conversion of mechanical piston motion into an electrical resonant or near-resonant signal. The second part explains how this resonant or near-resonant signal is identified, scaled, and observed.

In the first part of the description, the properties of the circuit that generates an electrical response from the mechanical movement of the piston are listed below.

[1] An alternating current is generated, amplified, and impressed on a series resonant, capacitor-and-inductor circuit, in which the capacitor is 39A [FIG. 1A] and the inductor is coil 29 [FIG. 4].

[2] Coil 29 of the series resonant circuit has a series resistance of six hundred (600) to two thousand (2000) ohms. Resistance is inherent in the turns of wire that make up the coil. The number of turns varies according to the gauge of the wire.

[3] The series resonant circuit has a quality factor, "Q", described by a ratio of inductive reactance to series resistance, that is sufficient for observing the change in amplitude caused by piston motion. The Q of the series circuit has a sharp tuning range of voltage and creates a near-linear change in frequency when the reference frequency is located in a range ±5% of bandwidth, midway between the peak Q frequency and either corner of the Q bandwidth frequencies. Q bandwidth is defined by a lower and an upper corner frequency, each of which occurs at a frequency where 0.707 of the maximum inductive or capacitive series resonant circuit voltage amplitude occurs. These corner frequencies are also know as one-half power points.

[4] The reference frequency of the AC voltage that is impressed on the resonant circuit is set below the resonant frequency on the higher or on the lower side of the resonant frequency, preferably in a region above the 0.707 half-power points.

[5] When a piston, made of ferromagnetic or other non-magnetized material that supports a magnetic field, moves in the electromagnetic field generated by coil 29, the voltage amplitude of the AC signal impressed on the coil is altered.

[6] Shield-cover 30 and end plates 30A and 30B [FIG. 4] enclose a space in which the magnetic lines of force are confined. This enclosure enhances any change in voltage amplitude of the impressed alternating signal, reduces external noise, and limits the effects of stray electromagnetic fields in the vicinity of coil 29.

[7] The voltage response from the preferred inductive portion or from the capacitive portion of the resonant circuit is rectified, amplified, and filtered to generate an analog signal that can be displayed appropriately for observation.

A resonant frequency is selected to be less than 4000 hertz. Changes, caused by a ferromagnetic piston, in the analog voltage signal impressed on the coil dramatically decrease at frequencies above 4000 hertz. While it is theoretically possible to choose any resonant frequency for the series capacitor-and-inductor circuit by using a coil of given value and selecting an appropriate capacitor, at frequencies above 4000 hertz the ability of ferromagnetic material moving axially with respect to the coil in order to change the amplitude of the alternating current signal is significantly reduced as frequency increases. This reduction in the ability of ferromagnetic material to alter the amplitude of a resonant signal is a result of the atomic properties of the ferromagnetic material. There is an upper frequency limit in the region of 15,000 hertz where ferromagnetic materials have little affect on the properties of a resonant circuit.

Coil spool 44 [FIG. 4] is made from a non-metallic, non-magnetic material, such as plastic, nylon, or teflon. If the coil spool is made from a metal, such as aluminum, the electrical signal response to the movement of a ferromagnetic piston is attenuated. The electromagnetic field generated primarily within the confines of shield-cover 30 and end plates 30A and 30B [FIG. 4] is more sensitive to ferromagnetic piston motion when the field is not further disturbed by extraneous metallic materials. The preferred material for split-bushings 100A, 101A, and 100B, 101B, used to displace the coil spool from contact with housing 90, and for bushing components, is also non-metallic and non-magnetic [all shown in FIG. 7B, FIG. 7C, FIG. 7D, FIG. 7E, and FIG. 7F].

The AC voltage response to piston movement is affected by the selection of a capacitor for the resonant circuit and by the voltage amplitude and frequency of the AC signal that is applied to the resonant circuit. The DC voltage requirements of semiconductors in the circuits of the secondary device provide limits for the voltage available at a reference frequency, for example, plus and minus fifteen volts DC. If a near-resonant AC peak voltage is greater than the DC limits, clipping of the AC voltage degrades sensitivity, accuracy, and resolution. To enhance a change in voltage in the neighborhood of the maximum resonant amplitude, the impressed AC voltage on the resonant circuit is set lower than fifteen volts, preferably in a range between four and six volts. This range permits a change in piston position, represented by a change in AC voltage, to be calibrated and displayed to show fluid flow rate.

For FIG. 8, the second part of the description here of the secondary device explains how the signals are identified, scaled, and observed. The electronic circuits are constructed in the following manner. Voltage-controlled oscillator 123 generates a five-volt, square-wave signal at a frequency determined by frequency adjustment 120. This square-wave, digital-pulse frequency is coupled to amplifier 125 by AC coupling capacitor 124 to remove the DC voltage level. Amplifier 125 increases the square-wave alternating voltage from two-and-one-half volts to a range of four-to-six volts, which is impressed upon series resonant circuit 126 as a near-resonant, reference AC voltage. With this range of reference voltage, the AC voltage across coil 29 [FIG. 4] of the resonant circuit will be in a higher voltage range as a result of the resonance effect. Coil 29 has one lead at zero potential (grounded). The voltage across the coil is held to a maximum of twelve to fourteen volts and buffered by voltage follower 127 to remove the loading effect of downstream circuit components. The near-resonant AC voltage of coil 29 is rectified by precision rectifier 128. The rectified near-resonant response, which is now a DC signal, is further buffered by an inverting amplifier 129 with an offset adjustment. By inverting the response signal, the amplifier provides a positive change of voltage as a piston moves toward coil 29. The offset adjustment for amplifier 129 permits the coil AC voltage to be reset to zero to define a zero flow rate. When a piston moves toward coil 29, the amplitude of the rectified resonant circuit voltage decreases below the zero offset. By inverting the input voltage, amplifier 129 provides a positive voltage swing from zero, that is filtered by low pass filter 130 to remove ripple. After filtering, the response is sent to signal conditioner 131, analog-to-digital converter 132, digital display 134, computer 133, and monitor 135.

Low pass filter 130 has a pronounced affect upon the time constant of the secondary device and, therefore, upon the time constant of the flowmeter. The time constant is dominated and determined by the mechanical properties of repositioning spring(s), piston(s), friction force(s), and damping within housing 90, and by the properties of the low pass filter. Thus, when mechanical properties are fixed and have a time constant on the order of 0.001 seconds, the dominant time constant of the flowmeter is determined by the electronic components used to construct filter 130.

Figure 9:
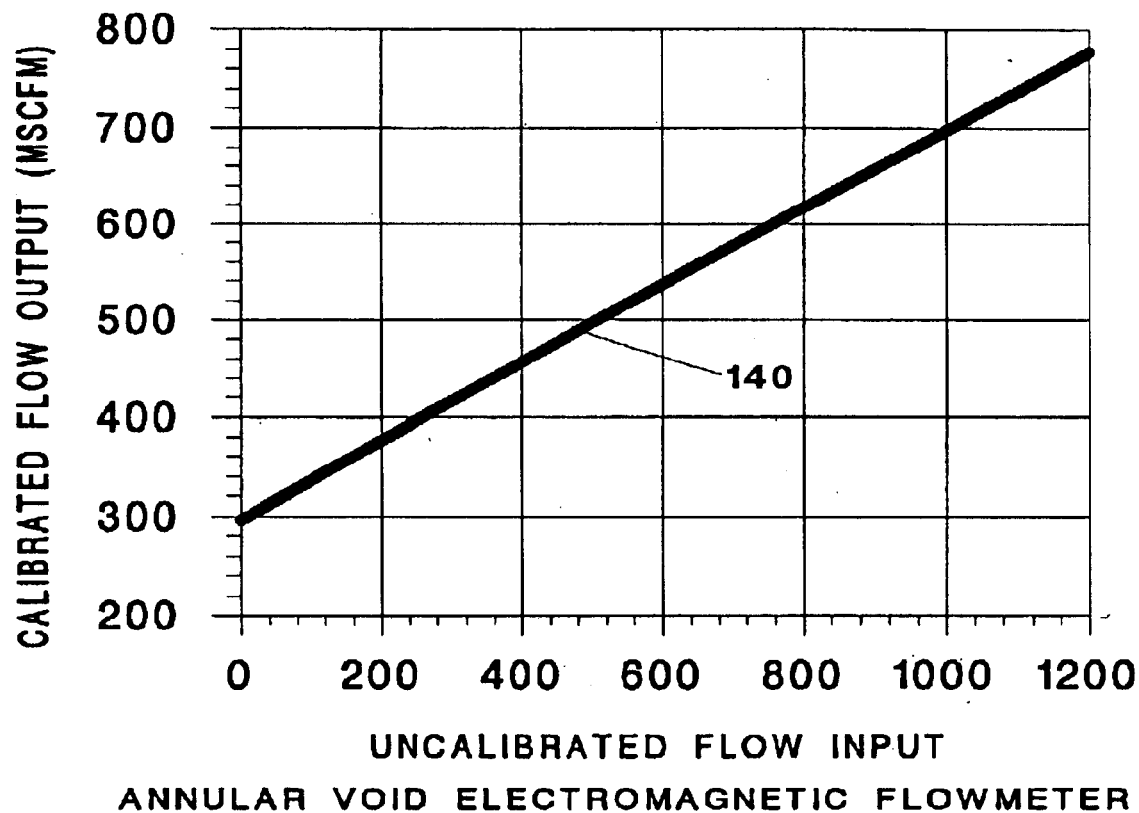
FIG. 9 shows a graph of a calibration curve for my AVEF.

FIG. 9 shows a calibration curve for my AVEF. The abscissa shows uncalibrated flow on a suitable scale. The ordinate shows calibrated flow rate based upon a primary or secondary calibration standard to which the AVEF is compared. When the AVEF is calibrated with respect to a critical flow nozzle, which is known to have linear response characteristics over a wide range of flow rates, calibration path 140 is linear over a similar wide range of flow rates. Calibration path 140 also shows that a threshold flow rate is required before the AVEF generates a fluid flow rate response. A threshold fluid flow rate is determined by the physical properties of the flowmeter, including piston mass, repositioning spring constant, friction forces, fluid density, and flowmeter size. Depending upon these parameters, the threshold fluid flow rate can be very small.

A preferred method to calibrate my AVEF comprises the steps below.

Step [1] Select a primary or secondary calibration standard for AVEF comparison. A Critical Flow Nozzle (CFN) is a suitable secondary calibration standard.

Step [2] Place a CFN in series with pressure sensors, located before and after the CFN, according to CFN calibration specifications. Ensure that there are no upstream pipe obstructions that can generate swirling fluid flow.

Step [3] Place an AVEF in series with the CFN, downstream of the CFN.

Step [4] Set the AVEF to its design voltage amplitude and frequency. Ensure that there is a zero flow rate setting in the absence of fluid flow.

Step [5] Conduct multiple tests of fluid flow rate, with fluid exhausted to the atmosphere, using impulse, step, ramp, frequency, and steady-state fluid flows at different driving force pressures to ensure a range of flow rates based upon different types of fluid flow.

Step [6] Measure the fluid flow rate indicated by the CFN and by the AVEF.

Step [7] Remove and replace the AVEF with an identical length of standard pipe.

Step [8] Conduct the same type of tests of fluid flow rate indicated in Step [5] with the CFN, to demonstrate that the AVEF is not affecting fluid flow rate during tests.

Step [9] Compare fluid flow rate data from the tests indicated in Steps [5] and [8]. Prepare a calibration graph of the type shown in FIG. 9.

The apparatus can also be calibrated for mass fluid flow rate. Flowing fluid is collected and weighed in a weigh-tank over time. Mass fluid flow rate is then converted to volumetric fluid flow rate.

Figure 10:
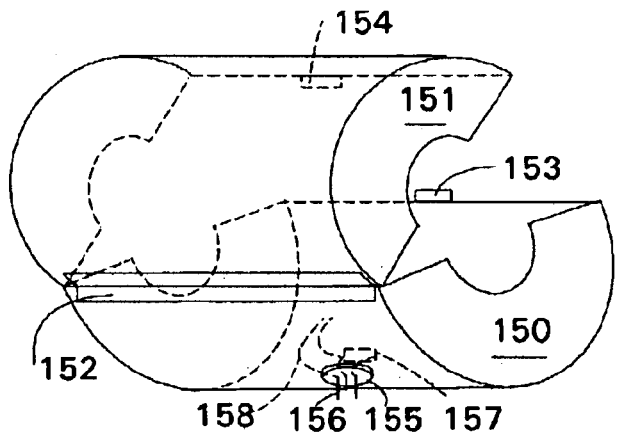
FIG. 10 shows a hinged shield-cover for coil(s) and housing.

FIG. 10 shows a schematic diagram of a hinged shield-cover that allows access to the coil and capacitor of the series resonant circuit of my AVEF without having to remove the AVEF from the fluid piping system. Lower-halfcover 150 is attached to upper-half-cover 151 by hinge 152. Lower fastener 153 and upper fastener 154 hold the lower and upper covers together when the shield-cover is placed over the AVEF housing (not shown). Electrical connector 155 with pins 156 is fixed to lower cover 150 to provide access to resonant circuit wires 158. Capacitor 157, in series resonant circuit 126 (FIG. 8), is attached to two pins of connector 155, one of which is shown as shorter than the other two pins. An alternating current signal is sent to the longer two pins in connector 155.

Using longitudinal coils 29C and 29D [FIG. 3] in the series resonant circuit of the secondary device permits the primary device, comprising pistons, springs, e/c chambers, and housing, to remain fixed in place when the longitudinal coils and capacitor of the series resonant circuit of the secondary device are removed. As a result, the entire secondary device of my AVEF [FIG. 8] is portable, thus allowing one secondary device to be used with primary devices of my AVEF that are placed at different locations in a fluid system.

The operation of the primary and secondary devices of the AVEF can be validated in several ways. If an AVEF is installed in a fluid system, the operation of the combined primary and secondary devices can be verified by changing the fluid flow rate through the AVEF housing and validating the calibration of the verified fluid flow rate. If fluid is not flowing through the housing, the operation of the secondary device can be verified by placing non-magnetized ferromagnetic material next to the coil(s) and validating the indicated, simulated, fluid flow rate.

If an AVEF is not installed in a fluid system, the operation of the primary device can be validated by connecting the primary and secondary devices together, artificially. moving the piston(s) inside the flowmeter housing, verifying the force required to move a piston, and validating the force and the simulated fluid flow rate indicated by the secondary device. The operation of the secondary device can be validated separately, by placing a non-magnetized ferromagnetic material next to the coil(s) and validating the indicated, simulated, fluid flow rate.

My Annular Void Electromagnetic Flowmeter [AVEF] is described with reference to a preferred embodiment. Others skilled in the Art of fluid flow rate measurements will be able to make various modifications of the described embodiment without departing from the spirit and scope of my Annular Void Electromagnetic Flowmeter. It is intended that all elements and steps that perform substantially the same function in substantially the same way to achieve substantially the same results are within the scope of my Annular Void Electromagnetic Flowmeter.

REFERENCE NUMERALS IN THE DRAWINGS
Drawing Numerals Page 1 of 5

FIG. 1

| | |
|---|---|
| 20 | fluid flowing through AVEF |
| 21 | flowmeter entry pipe |
| 22 | flowmeter exit pipe |
| 23 | first piston |
| 24 | first piston void |
| 25 | second piston |
| 26 | second piston void |
| 27 | flowmeter housing |
| 28 | repositioning spring |
| 29 | coil |

-continued

| | |
|---|---|
| 30 | shield-cover |
| 31 | inlet e/c chamber |
| 32 | outlet e/c chamber |
| 33 | sensor unit |
| 34 | signal conditioning unit |
| 35 | analog-to-digital conversion unit |
| 36 | digital display unit |
| 37 | computer |
| 38 | monitor |

FIG. 1A

| | |
|---|---|
| 30A | first shield-cover end plate |
| 30B | second shield-cover end plate |
| 39 | wire connector |
| 39A | capacitor |

FIG. 2

| | |
|---|---|
| 29A | first axial coil |
| 29B | second axial coil |
| 39B | first axial coil leads |
| 39C | second axial coil leads |

FIG. 3

| | |
|---|---|
| 29C | first longitudinal coil |
| 29D | second longitudinal coil |

REFERENCE NUMERALS IN THE DRAWINGS
Drawing Numerals Page 2 of 5

| | |
|---|---|
| 39D | first longitudinal coil leads |
| 39E | second longitudinal coil leads |
| 40A | first shield-cover |
| 40B | second shield-cover |

FIG. 4

| | |
|---|---|
| 41 | threads on housing 27 |
| 42 | first end cap |
| 43 | second end cap |
| 44 | coil spool |
| 45 | coil screw |
| 46A | first end nut |
| 46B | second end nut |
| 47 | first securing means |
| 48 | second securing means |
| 49 | first end cap external threads |
| 50 | second end cap external threads |
| 51 | first end cap internal threads |
| 52 | second end cap internal threads |

FIG. 5

| | |
|---|---|
| 60 | fluid streamlines |
| 61 | expanded fluid |

FIG. 5A

| | |
|---|---|
| 70 | piston face |
| 71 | recessed notch (for spring 28) |
| 72 | drag recess (of piston) |

FIG. 5B [no new numerals]
FIG. 6

| | |
|---|---|
| 80 | flowmeter housing (with internal threads) |
| 81A | first internal threads |
| 81B | second internal threads |

REFERENCE NUMERALS IN THE DRAWINGS
Drawing Numerals Page 3 of 5

| | |
|---|---|
| 82A | first securing end plug |
| 82B | second securing end plug |
| 83A | first "O" ring seal |
| 83B | second "O" ring seal |
| 84A | first e/c chamber |
| 84B | second e/c chamber |
| 85A | first extended e/c chamber |
| 85B | second extended e/c chamber |
| 86A | first internal plug threads |
| 86B | second internal plug threads |
| 87A | first pipe screwed into end plug |
| 87B | second pipe screwed into end plug |

-continued

| FIG. 6A | |
|---|---|
| 81C | external male plug threads |
| FIG. 7 | |
| 90 | instrumentation tubing housing |
| 91A | first spacer |
| 91B | second spacer |
| FIG. 7A | |
| 92 | compression sleeve locking nut |
| 93 | compression sleeve |
| 94 | compression fitting |
| 95 | instrumentation e/c chamber |
| FIG. 7B | |
| 100A | upper part, first split-bushing |
| 100B | lower part, first split-bushing |
| 101A | upper part, second split-bushing |
| 101B | lower part, second split-bushing |
| 108A | first shaft |
| 108B | second shaft |

REFERENCE NUMERALS IN THE DRAWINGS
Drawing Numerals Page 4 of 5

| FIG. 7C | |
|---|---|
| 102 | coil recess |
| 103 | machine bolt recess |
| 104 | machine bolt threads |
| 105 | hole for shaft 108A |
| 106 | hole for shaft 108B |
| FIG. 7D [no new numerals] | |
| FIG. 7E | |
| 107 | machine bolt |
| FIG. 7F | |
| 109A | first end fastener for shaft 108A |
| 110A | second end fastener for shaft 108A |
| FIG. 8 | |
| 120 | frequency adjustment |
| 121 | amplitude adjustment |
| 122 | piston motion |
| 123 | voltage-controlled oscillator |
| 124 | AC coupling capacitor |
| 125 | amplifier |
| 126 | series resonant circuit |
| 127 | voltage follower |
| 128 | precision rectifier |
| 129 | inverting amplifier with offset adjustment |
| 130 | low pass filter |
| 131 | signal conditioner |
| 132 | analog to digital converter |
| 133 | computer |
| 134 | digital display |
| 135 | monitor |
| FIG. 9 | |
| 140 | calibration path (for AVEF) |

REFERENCE NUMERALS IN THE DRAWINGS
Drawing Numerals Page 5 of 5

| FIG. 10A | |
|---|---|
| 150 | lower-half cover |
| 151 | upper-half cover |
| 152 | hinge |
| 153 | lower fastener |
| 154 | upper fastener |
| 155 | electrical connector |
| 156 | electrical connector pins |
| 157 | series-resonant-circuit capacitor |
| 158 | resonant circuit wires |

I claim:

1. A fluid-flow-rate measuring apparatus for indicating the rate of flow of fluid through said apparatus that is connected to an open or to a closed conduit for flowing fluid, with said apparatus having means to detect explosive, fast-transient, slow-transient, pulsating, and/or steady-state rate of fluid flow, that may be in multiple phase composition, by sensing a change in an electromagnetic field generated by one or more coils of a resonant electronic or electrical circuit, and which electromagnetic field is altered by the movement of one or more pistons made from a material that supports a magnetic field, thereby permitting detection of a change in current and voltage, and where said piston(s) is (are) longitudinally and axially disposed within said apparatus housing, and where displacement of said piston(s) is caused by fluid forces upon the upstream surface(s) of said piston (s), and with said apparatus comprising:

(a) an open or closed housing of non-magnetic material to contain a flowing fluid;

(b) one or more pistons longitudinally and axially positioned in the housing of (a), with said piston(s) held in position by one or more resilient-restoring members to maintain a reference position for said piston(s) and to permit said piston(s) to slide against said restoring members within said housing as a result of force generated on said piston(s) by a fluid flowing though the housing, and with said piston(s) and resilient-restoring member(s) held within said housing by piston-retaining members at each end of said housing that are secured to said housing, where necessary, by means to maintain pressure-tight security, for closed conduits systems, of the fluid within said housing;

(c) a fluid expansion chamber contiguous to an upstream piston, which expansion chamber permits a flowing fluid to expand within the apparatus to generate force on the face of a piston so as to move the piston laterally or longitudinally from a reference position as a result of the force generated by the expanding fluid, and a fluid contraction chamber contiguous to a downstream piston, or to a resilient-restoring member, which contraction chamber restores fluid conditions to a fluid state before fluid expansion in said expansion chamber;

(d) one or more electrical-electronic coil devices [i] which may consist of continuous turns of insulated, electrically conductive wire to form a cylindrical coil, with a circular void in the center, to be placed axially on the housing of (a), or [ii] which may consist of continuous turns of insulated, electrically conductive wire to form a longitudinal, continuous coil, with a longitudinal void at the center, that can be removed from a position contiguous to the housing of (a) without removing the housing from the fluid system;

(e) an electromagnetic shield-cover, constructed of material that reduces or blocks electromagnetic field interference, said cover also containing or restricting within its confines an internal electromagnetic field generated by one or more coils of (d), while simultaneously reducing noise from stray ferrous materials and from electromagnetic, electronic, and electrical signals;

(f) a means to move the continuous-wire coil(s) of (d), configured as one or more coils, either axially or longitudinally on the housing of (a), in order to establish a reference position for the coil(s) with respect to the mechanical piston(s) of (b) inside the housing;

(g) a means to hold in place continuous-wire coil(s) of (d) either axially or longitudinally in relation to the longitudinal axis of the housing of (a), so that the coil(s) will retain a fixed position relative to a zero position of piston(s) of (b) inside the housing;

(h) a means to place a label on the housing of (a) that shows a reference position for the continuous-wire coil(s) of (d), and that identifies the specifications of the apparatus, including electronic settings, and type of coil, (i) a means to provide direct current electrical power to the electronic components of the apparatus, so that both direct current and voltage, and alternating current and voltage generated by the electronics, can be adjusted to set the frequency and amplitude, and the off-set current and voltage, all of which are used in combination with electronic circuits and components to convert mechanical piston motion into electronic signals that indicate fluid flow rate for display on an analog or digital voltage or current indicator.

2. The apparatus of claim 1 with a primary device comprising a housing, piston(s), resilient-restoring means, piston-retaining members, spacers, an expansion chamber, and a contraction chamber, to generate a primary indication of fluid flow rate.

3. The apparatus of claim 1 with a secondary device comprising a series-resonant or a parallel-resonant circuit that includes resistance, capacitance, and inductance of coil(s); and comprising means to generate alternating current and voltage; means to adjust frequency and amplitude; means for coupling alternating current signals, means to provide zero off-set currents and voltages; means to amplify alternating and direct currents and voltages; means to buffer electronic signals to reduce circuit loading effects; means to rectify alternating current and voltage signals precisely; means to filter noise from alternating current and voltage signals; means to move coil(s) on the housing; means to shield electronic and electrical components from electromagnetic interference while containing internal electromagnetic fields; and means to display fluid flow rate information.

4. The apparatus of claim 1 in which piston(s) may have voids that are less than, equal to, or greater than the inside dimensions of the conduit through which fluid flows in a fluid system, and in which said voids can have any cross-sectional area configuration, including circular, square, triangular, or other type of configuration.

5. The pistons of claim 4 in which each piston may be fabricated with a face that is strictly perpendicular from the piston outer edge to the piston inner edge, with respect to the longitudinal axis of the piston, or fabricated with a face that is a curve from the piston outer edge to the piston inner edge, with respect to the longitudinal axis of the piston.

6. The apparatus of claim 1 in which structural components of the apparatus that are located inside the shield-cover and outside of the housing are fabricated from a suitable non-magnetic material.

7. The apparatus of claim 1 in which the housing and resilient-restoring member(s) are fabricated from a suitable non-magnetic material.

8. The apparatus of claim 1 in which the electromagnetic shield-cover is fabricated to permit access to the coil(s) without removing the coil(s), or to remove the coil(s), by constructing the shield-cover in one unit, with end plates, that will slide away from the housing but not off of the fluid conduit, or by constructing said cover in multiple sections that are hinged or otherwise fastened so that the cover will open and close on the housing.

9. The apparatus of claim 1 in which the secondary device is portable, such that when a primary device is installed in a fluid system, a secondary device, with longitudinal coil(s) can be placed on the housing to measure the fluid flow rate(s) and can then be removed, leaving the primary device in place.

10. The apparatus of claim 1 in which the housing and the piston-retaining members can be fabricated from standard pipe components that are modified for tolerances of sliding pistons and of expansion and contraction chambers.

11. The apparatus of claim 1 in which electronic components, including a low pass filter component, permit adjustment of the time constant of the apparatus for the measurement of explosive, fast-transient, pulsating, or steady-state fluid flow rates.

12. The apparatus of claim 1 in which the fluid flow rate is identified in proportion to a change of an impressed electromagnetic field on one or more coils a resonant electrical circuit.

13. The apparatus of claim 1 in which the housing may have an inside, cross-sectional dimension that is larger than the fluid conduit to which said apparatus is attached.

14. The apparatus of claim 1 in which fluid flow can be either in a forward, first direction or in a reverse, second direction through the apparatus, with said flow indicated by the motion of one or more internal pistons longitudinally disposed within the housing, so that in either direction of flow, one or more pistons will move longitudinally to alter the electromagnetic field generated by one or more coil(s).

15. The apparatus of claim 1 in which electrical leads from continuous wire coil(s) are fixed or plugged into an electrical connector that is fixed to the shield-cover, so that electronic circuits and components of the secondary device can be connected to the coil.

16. The apparatus of claim 1 in which fluid flow may be in either direction through the apparatus, and in which said apparatus may indicate a fluid flow rate in one direction that is in a different range of flow rates from a fluid flow rate in the opposite direction because of differences in the physical properties of components of the primary device, including piston mass and spring constant, with one piston and one spring indicating flow rate in one direction, and one piston and one spring indicating flow rate in the opposite direction, so that each piston and each spring functions independently of the other piston and spring.

17. The apparatus of claim 1 in which the flow rate of a single or multiphase fluid is indicated, first, by a change in fluid density in an upstream expansion chamber and, then, by a force impressed on a piston of the apparatus by the expanding fluid.

18. A volumetric fluid-flow-rate method to calibrate the apparatus of claim 1, comprising the following steps:

Step [i] select either a primary or a traceable-secondary, volumetric, fluid-flow-rate calibration standard in order to compare the responses of said calibration standard with the responses of said apparatus;

Step [ii] install the primary or secondary calibration standard in a fluid system;

Step [iii] install said apparatus in series, downstream of the calibration standard;

Step [iv] place the coil(s) at a reference position, select an alternating current voltage amplitude and frequency, and set initial conditions for fluid flow rate;

Step [v] conduct multiple tests of fluid flow rate, with fluid exhausted to the atmosphere or to a fluid collection chamber, using impulse, step, ramp, frequency, and steady-state fluid flows at different driving force pressures to ensure a range of flow rates based upon different types of fluid flow;

Step [vi] measure the fluid flow rate with the selected calibration standard and measure the fluid flow rate with said apparatus;

Step [vii] replace said apparatus with an identical length of standard pipe;

Step [viii] conduct the same type of tests of fluid flow rate indicated in Step [v] with the calibration standard, to demonstrate that the apparatus of claim 1 is, or is not, affecting fluid flow rates during the tests; and Step [ix] tabulate fluid flow rate data from tests indicated in Steps [v] and [viii], and prepare a calibration graph.

19. A mass fluid-flow-rate method to calibrate the apparatus of claim 1, comprising the following steps:

Step [i] select either a primary or a traceable-secondary, mass fluid-flow-rate calibration standard system in order to compare the responses of said calibration standard with the responses of said apparatus;

Step [ii] install said apparatus in the selected mass calibration standard system;

Step [iii] conduct multiple tests of flow rate, with fluid exhausted to a fluid collection device, using impulse, step, ramp, frequency, and steady-state fluid flows at different driving force pressures to ensure a range flow rates based upon different types of fluid flow; and, Step [iv] tabulate fluid-flow-rate data from Step [iii], convert mass fluid flow rate to volumetric fluid flow rate, and prepare a calibration graph.

20. Methods to validate the operation of the apparatus of claim 1, comprising the following:

(a) when the apparatus is installed in a fluid system and fluid is flowing through the housing of the apparatus, to validate operation of the secondary device, Step [i] obtain a measurement of fluid flow rate with the secondary device;

Step [ii] remove the shield-cover, place a component of known dimensions and composition, made of a non-magnetized ferromagnetic material, contiguous to the housing and to the exposed coil(s), then replace the shield-cover;

Step [iii] verify the change in indicated fluid flow rate caused by the non-magnetized ferromagnetic component; and, Step [iv] compare the indicated fluid flow rate to known data acquired during a prior validation of the apparatus and, if necessary, adjust the position of the coil(s) and/or of the settings of the electronic circuits;

(b) when the apparatus is installed in a fluid system and fluid is not flowing through the housing of the apparatus, to validate operation of the secondary device, Step [i] remove the shield-cover, place a component of known dimensions, made of a non-magnetized ferromagnetic material, contiguous to the housing and to the exposed coil(s), then replace the shield-cover;

Step [ii] verify a simulated change of indicated fluid flow rate caused by the non-magnetized ferromagnetic component; and, Step [iii] compare the simulated change in indicated fluid flow rate to known data acquired during a prior validation of the apparatus and, if necessary, adjust the position of the coil(s) and/or of the settings of the electronic circuits;

(c) when the apparatus is not installed in a fluid system, to validate the operation of the secondary device, follow the steps in (b); and, (d) when the apparatus is not installed in a fluid system, to validate the operation of a set of combined primary and secondary devices of the apparatus, Step [i] connect the secondary device to the primary device;

Step [ii] artificially move each piston of the primary device with a non-magnetic not connected to a force-indicator;

Step [iii] verify both the force required to move a piston a given displacement and the resulting simulating fluid flow rate; and, Step [iv] compare the verified force on the piston and the resulting simulated fluid flow rate to similar data acquired from a prior validation of the same set of primary and secondary devices and/or of other sets of combined devices.

* * * * *

UNITED STATES PATENT AND TRADEMARK OFFICE
CERTIFICATE OF CORRECTION

PATENT NO. : 6,752,026 B1 Page 1 of 1
DATED : June 22, 2004
INVENTOR(S) : Thomas Allen Hyde It is certified that error appears in the above-identified patent and that said Letters Patent is hereby corrected as shown below:

Column 1,
Lines 21 and 32, "flowmeter" should read -- flowmeters --
Lines 33 and 43, "Flowmeter" should read -- Flowmeters --

Column 2,
Lines 5, 9 and 14, "flowmeter" should read -- flowmeters --

Signed and Sealed this

Fourteenth Day of December, 2004

JON W. DUDAS
*Director of the United States Patent and Trademark Office*